United States Patent
Scrivano (10) Patent No.: US 12,130,781 B2
(45) Date of Patent: Oct. 29, 2024

(54) SPARSE FILES AWARE ROLLING CHECKSUM

(71) Applicant: Red Hat, Inc., Raleigh, NC (US)

(72) Inventor: Giuseppe Scrivano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 57 days.

(21) Appl. No.: 17/731,955

(22) Filed: Apr. 28, 2022

(65) Prior Publication Data

US 2023/0350852 A1    Nov. 2, 2023

(51) Int. Cl.
| | | |
|---|---|---|
| G06F 16/00 | (2019.01) | |
| G06F 16/11 | (2019.01) | |
| G06F 16/13 | (2019.01) | |
| G06F 16/178 | (2019.01) | |

(52) U.S. Cl.
CPC .......... *G06F 16/178* (2019.01); *G06F 16/113* (2019.01); *G06F 16/137* (2019.01)

(58) Field of Classification Search
CPC ..... G06F 16/178; G06F 16/113; G06F 16/137
See application file for complete search history.

(56) References Cited

U.S. PATENT DOCUMENTS

| | | | |
|---|---|---|---|
| 5,893,086 A * | 4/1999 | Schmuck | ............ G06F 11/1435 |
| 7,689,609 B2 | 3/2010 | Lango | |
| 7,716,445 B2 | 5/2010 | Bonwick | |
| 9,015,181 B2 | 4/2015 | Kottomtharayil | |
| 10,078,549 B2 | 9/2018 | Karamanolis | |
| 10,102,057 B2 | 10/2018 | Karamanolis | |
| 10,956,274 B2 | 3/2021 | Attarde | |

OTHER PUBLICATIONS

IBM Corp, Sparse Files, Mar. 3, 2021.

* cited by examiner

*Primary Examiner* — Tyler J Torgrimson
(74) *Attorney, Agent, or Firm* — Kilpatrick Townsend & Stockton LLP (57) ABSTRACT

A sparse files aware rolling checksum is provided by passing, in sequence, each byte of an archival file to a hash function; and in response to: detecting that a sequence of bytes from the archival file produce outputs from the hash function of zero, wherein a number of bytes in the sequence of bytes satisfies a chunk-end threshold, and determining that the sequence of bytes is located in a hole in the archival file of a greater number of bytes than the chunk-end threshold: designating a hole-chunk of the archival file that includes metadata for a location and a length of the hole in the archival file.

20 Claims, 5 Drawing Sheets

SPARSE FILES AWARE ROLLING CHECKSUM

BACKGROUND

An image of a computing system (also referred to as a disk image, image backup, backup image, image copy, or copy image) is copy of the contents of a memory storage device, which includes the partitions and various other system information that may be omitted in data backups or copies of individual files. These images may be applied to physical or virtual memory storage devices to copy the state of a source system to a destination system.

Images offer users several benefits in speed and implantation of configuration setting over coping and replacing of one or more files when copying of a computing environment from one system to another (e.g., to implement a new baseline to the computing system, to restore a backup, etc.). In various examples, the image can be a clone (e.g., an exact copy, including unused space on the memory storage device) or a reduced-size image that accounts for repeated patterns of data or unused space on the memory storage device via compression. To further reduce the amount of data needed for an image, some systems may split the image into multiple streams or chunks, allowing a destination computing system to select one or more portions of the image that include differences relative to corresponding section of the destination computing system's storage device. Accordingly, the destination system may request and implement only these different sections when synchronizing with an image provided by a source system.

SUMMARY

The present disclosure provides new and innovative ways to handle synchronizations between a source system and a destination system when an image or other archival file is divided into chunks for transmission and implementation. By identifying sequences of bits that that are set to zero and represent unused space that is greater than an end-chunk threshold, the computing device can create a chunk that represents all (or almost all) of this unused space rather than produce and handle a multitude of chunks that correspond to divisions of the unused space in the image.

In one example, a method is provided that comprises: passing, in sequence, each byte of an archival file to a hash function; and in response to: detecting that a sequence of bytes from the archival file produce outputs from the hash function of zero, wherein a number of bytes in the sequence of bytes satisfies a chunk-end threshold, and determining that the sequence of bytes is located in a hole in the archival file of a greater number of bytes than the chunk-end threshold: designating a hole-chunk of the archival file that includes metadata for a location and a length of the hole in the archival file.

In one example, a system is provided that comprises a processor; and a memory including instructions that when executed by the processor perform operations comprising: passing, in sequence, each byte of an archival file to a hash function; and in response to: detecting that a sequence of bytes from the archival file produce outputs from the hash function of zero, wherein a number of bytes in the sequence of bytes satisfies a chunk-end threshold, and determining that the sequence of bytes is located in a hole in the archival file of a greater number of bytes than the chunk-end threshold: designating a hole-chunk of the archival file that includes metadata for a location and a length of the hole in the archival file.

In one example, a memory device is provided that includes instructions that when executed by a processor perform operations comprising: passing, in sequence, each byte of an archival file to a hash function; and in response to: detecting that a sequence of bytes from the archival file produce outputs from the hash function of zero, wherein a number of bytes in the sequence of bytes satisfies a chunk-end threshold, and determining that the sequence of bytes is located in a hole in the archival file of a greater number of bytes than the chunk-end threshold: designating a hole-chunk of the archival file that includes metadata for a location and a length of the hole in the archival file.

Additional features and advantages of the disclosed methods, devices, and/or systems are described in, and will be apparent from, the following Detailed Description and the Figures.

DETAILED DESCRIPTION

Various standards, such as the Open Container Initiative (OCI), distribute images for a container as a set of archival files (often referred to a tarballs or tarfiles), with one archival file per layer (e.g., organized per the overlay file system), where each layer includes a subset of the files in the image. By dividing the image or archival files thereof into several chunks, the destination system can receive and implement all or some of the chunks to reduce the amount of data to be transferred and computing resources used (e.g., by not receiving and subsequently writing the contents of an archival files that matches the current state of a corresponding portion of the receiving device). Various utilities and functions, such as rsync, allow users to handle the transfer and synchronization of the whole or partial image; however, these utilities and functions often use a hash function, such as a rolling checksum, as a control for how to divide the image into chunks for transfer and writing to the destination device. This rolling checksum uses the binary nature of computer data to identify the end of a chunk when at least a threshold number of bits in sequence are set to zero. For example, when the chunk-end threshold is set to N, a sequence of N bytes (of eight bits each) with a value of zero from the rolling checksum indicates the end of the chunk. An archival file can thereby be divided into several chunks that are of different sizes by a rolling checksum function based how the file is structured and where sequences of at least N bytes set to zero are located.

Some archival files, however, are sparse and include large sequences of bytes that are set to zero. As used herein, a sparse file refers to a file that includes a sequence of bytes with the value of zero (e.g., unused space), where the length of the sequence is greater than the chunk-end threshold of N (often much greater). This sequence of bits with values set to zero, when disposed between two bits set to one is referred to herein as a hole in the associated file. For example, when N is set to 32, when 265 bits in sequence are observed to be set to zero, the end of the current chunk in the archival file may be defined. However, when processing a hole, a traditional rolling checksum could divide a sufficiently large hole into several chunks. These several chunks, despite representing a section of the archival file that holds no data (e.g., where the bits are all set to zero) are each associated with identifying metadata, and require additional processing resources to handle, thereby decreasing the efficiency at which the source system generates and the destination system applies the image, increasing the amount of data to be transferred, and increasing the amount of data to be stored by the source system.

To improve the functionality of the computing devices used in the synchronization operation (e.g., dividing and managing how to divide an image for provision from a source to a destination device), the present disclosure provides for a new filtering behavior for use with existing rolling checksum functions. By using the new filter described herein, a user may set dynamic sizes for the chunk-end threshold and the length of a sequence that qualifies as a hole, and seamlessly identify data-chunks and hole-chunks in the archival file. An individual hole-chunk potentially represents a much larger section of the archival file than any individual data-chunk represents, and can be compressed to a much greater degree; thereby reducing the amount of data needed to be stored and transferred in relation to the archival file. Additionally, in some examples, when a destination system requests the archival file, the hole-chunks may be omitted in the transmission, further reducing the amount of data to be transferred.

Figure 1:
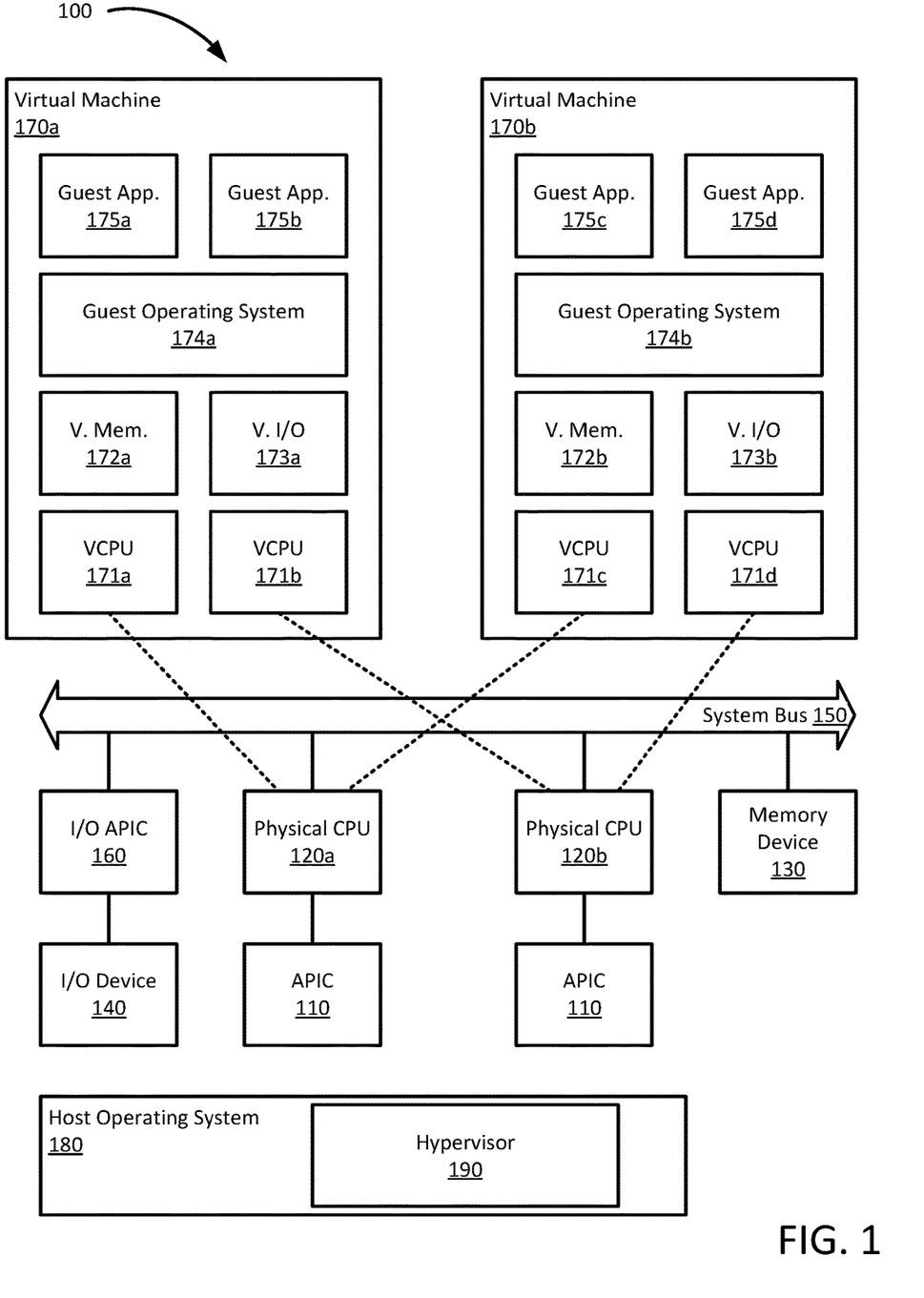
FIG. 1 illustrates a high-level component diagram of a computer system, according to examples of the present disclosure.

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b. When the hypervisor 190 allows a VM 170 to simultaneously run two or more VCPUs 171 on two or more PCPUs 120, that VM 170 may be referred to as an SMP VM 170. For example, when the processing threads of the first VCPU 171a and the second VCPU 171b are scheduled at overlapping times, the first VM 170a may be identified as an SMP VM 170.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

In various examples, the first VM 170*a* may provide or host an archival file, such as a backup image, as a virtual source system, in which the second VM 170*b* is to receive and implement the archival file as a virtual destination system. In some examples, the VMs 170 may request and receive an archival file from a separate computing system 100. In another example, a first computing system not running any VMs 170 may be a destination system for an image revived from a VM 170, a hypervisor 190, or another system not running any VMs 170. Stated differently, one, both, or none of the source system and the destination system for an image file may be a VM 170. Additionally, one source system may supply the same image to multiple destination systems in series or concurrently.

Figure 2A:
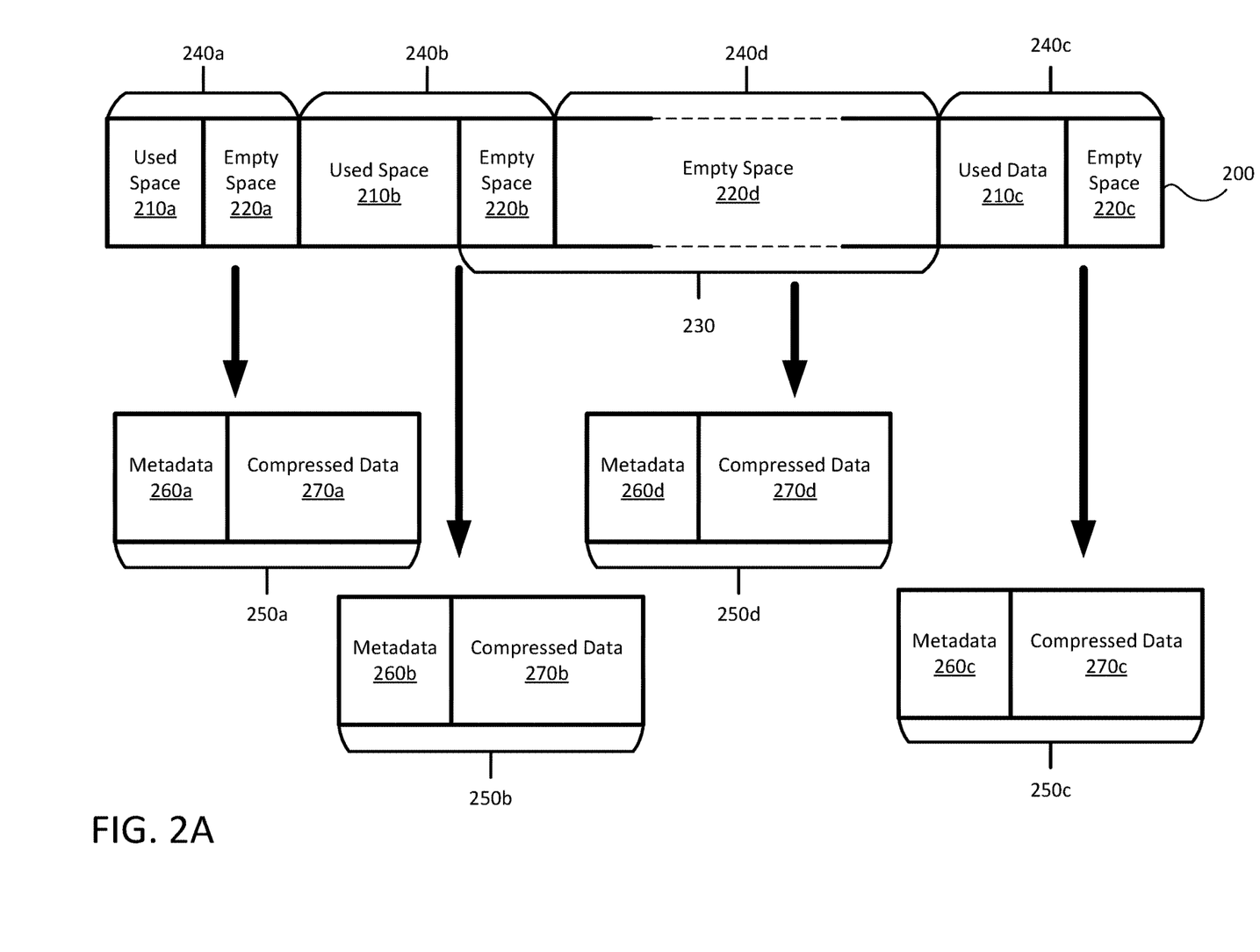
FIG. 2A illustrates a division of an archival file that includes a hole into chunks, according to examples of the present disclosure

FIG. 2A illustrates a division of an archival file 200 that includes a hole 230, into chunks 240*a-d* (generally or collectively, chunks 240), according to examples of the present disclosure. As illustrated, the archival file 200 includes several sequences of used space 210*a-c* (generally or collectively, used space 210) with mixed values of ones and zeroes in the representative bits to store data. The archival file 200 may represent an image of a physical storage device or a virtual storage device, in which the illustrated spaces are read from left to right (e.g., used space 210*a* comes before empty space 220*a*, which comes before used space 210*b*, etc. in the sequence) for purposes of the examples given herein.

In FIG. 2A, the segments of data in the used space 210 are separated from one another by empty space 220*a-d* (generally or collectively, empty space 220) that contains representative bits that are all set to zero. In various examples, the amount of bits included in the empty space may be used as padding between segments of the used space 210 or may be reserved by an operating system for various other uses.

The amount of bits in a given region of used space 210 may vary from region to region. For example, the first used space 210*a* may represent a region of X bytes, while the second used space 210*b* represents a region of Y bytes, where X≠Y. A user or the operating system may designate the number of bytes needed to follow a region of used space 210 to designate the end of a chunk (e.g., a chunk-end number). Accordingly, the first empty space 220*a*, the second empty space 220*b*, and the third empty space 220*c* each include N bytes, where N is the designated chunk-end number.

After identifying an empty space 220 of at least N bytes following a used space 210, the system may define a corresponding chunk 240. For example, the first chunk 240*a* includes the first used space 210*a* and the first empty space 220*a* of N bytes, while the second chunk 240*b* includes the second used space 210*b* and the second empty space of N bytes. One example of a function used to identify whether N sequential bytes with bits set to zero have been observed is a rolling checksum function (also referred to as a rolling hash or recursive hashing function). Rolling checksum functions, such as crc-32, adler-32, fletcher-32, offer the ability to move an analysis window (e.g., via register shifting) to determine a hash of the input values. When the hash of a window set to a sequence of N bytes returns a zero value, indicating that those bytes contain all zeroes, the system identifies that those bytes are empty space 220, which may signal the end of a chunk 240.

Figure 2B:
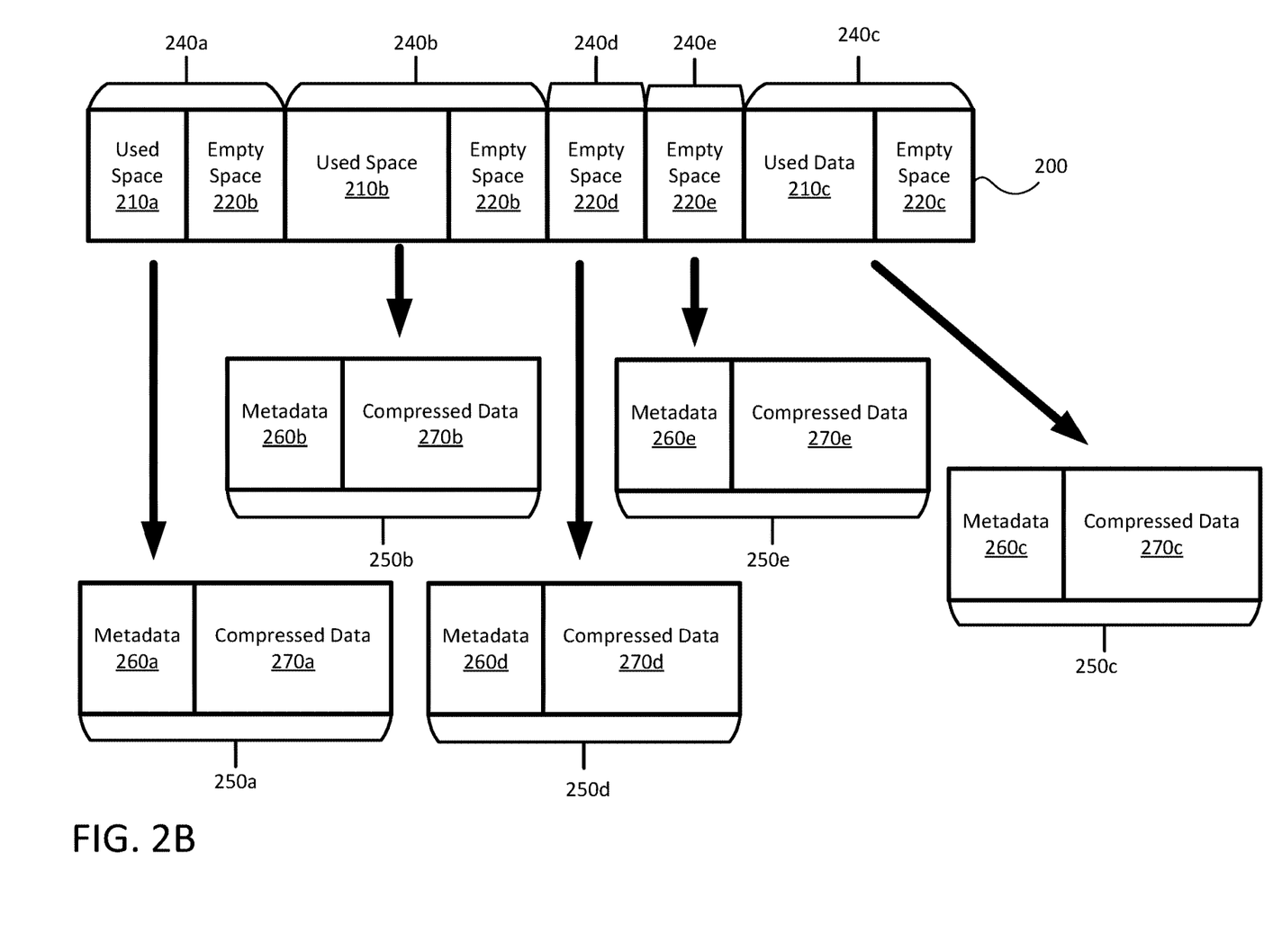
FIG. 2B illustrates the division of an archival file into chunks, according to examples of the present disclosure.

Unless signaled otherwise, the system may identify sequential groups of empty spaces 220 of N bytes as individual chunks 240. For example, FIG. 2B illustrates the division of an archival file 200 into chunks 240*a-e*, according to examples of the present disclosure. In FIG. 2B, the second empty space 220*b*, the fourth empty space 220*d*, and the fifth empty space 220*e* are in sequence, and each represent N bytes of bits set to zero. Accordingly, the system may identify the fourth empty space 220*d* as a fourth chunk 240*d* and the fifth empty space 220*e* as a fifth chunk 240*e*.

In a sparse file, however, the number of sequential bytes with bits set to zero may be greater than the chunk-end number, and may result in a corresponding large number of chunks 240 unless the hole 230 is identified and treated differently from a smaller empty space 220. In various examples, a user or the operating system may define a size of a sequence of zero-bytes to qualify as a hole 230, such as in FIG. 2A, to allow the system to identify all of the holes 230 as a single chunk 240 rather than a set of chunks 240 each representing N bytes that contain bits set to zero, such as in FIG. 2B.

In various examples, the user or operating system can define a hole 230 to be at least Mbytes in size, where M may be defined based on N (e.g., M>>N, M>10N, etc.) or a set value (e.g., M=1 gigabyte (GB), 500 kilobytes (kB), etc.). Accordingly, when the total sequential unused space is at least M+N bytes in length, as in FIG. 2A, the system may identify the later bytes (e.g., the fourth empty space 220*d*) to be one chunk 240. In contrast, as in FIG. 2B, when the total empty space is greater than N bytes, but is not at least M+N bytes in length (e.g., if M were set to 5N), the system may continue to divide the unused space into empty spaces 220 of N bytes in which each is associated with a corresponding chunk 240.

Although FIG. 2A illustrates a single hole 230 in the archival file 200, other examples may include more than one hole 230 or no holes 230 (e.g., FIG. 2B). In various examples, a hole 230 may include an empty space 220 that defines an end of a data-chunk or the beginning of a data-chunk that begins with one or more bytes set to zero as well as a large portion (e.g., greater and N bytes) of empty space 220 that is associated with a hole-chunk. However, having a hole 230 border another hole 230, or dividing the empty space 220 into two or more hole-chunks would result in additional metadata being used to describe both divisions of empty space 220, when one set of metadata would be sufficient.

Each of these chunks 240 may be further processed to produce a corresponding sync-ready chunk 250*a-e* (generally or collectively, sync-ready chunk 250). Each sync-ready chunk 250*a-e* includes a corresponding elements of metadata sections 260*a-e* (generally metadata section 260) and compressed data sections 270*a-e* (generally or collectively, data section 270). Although illustrated with the metadata sections 260 provided as headers or the corresponding data sections 270, in various examples, the metadata sections 260 may be provided as an index structure without the corresponding data sections 270, or as footers to the corresponding data sections 270.

The metadata section 260 includes various metadata related to where the chunk 240 was located in the archival file 200 (e.g., an offset of the chunk 240 in the archival file 200 relative to a reference or origin bit, a length of the chunk 240, whether the chunk 240 represents a hole 230, a value for the checksum of the data included in the chunk 240). These metadata allow the destination system to determine (e.g., via an rsync function) whether a certain chunk 240 should be requested from the source system or implemented on the destination system to match the destination system to the source system.

The compressed data section 270 includes the data from the corresponding used space 210 and empty space 220 of the chunk 240 in a reduced-size format that the destination system can decompress to yield the original used space 210 and empty space 220. By compressing the data of the chunk 240, fewer storage and transmission resources may be used to store and provide the archival file 200. Because the metadata section 260 adds a nominal amount of data to the sync-ready chunk 250, as the ratio of used space 210 to empty space 220 in the chunk 240 decreases, the improvements offered by compressing the data may be reduced. However, by identifying a hole 230 and assigning the hole 230 to a single chunk 240, rather than a series of chunks 240 each of N bytes in size, the user may reduce the amount of metadata needed to handle the chunks 240 representing a large section of unused space.

Figure 3:
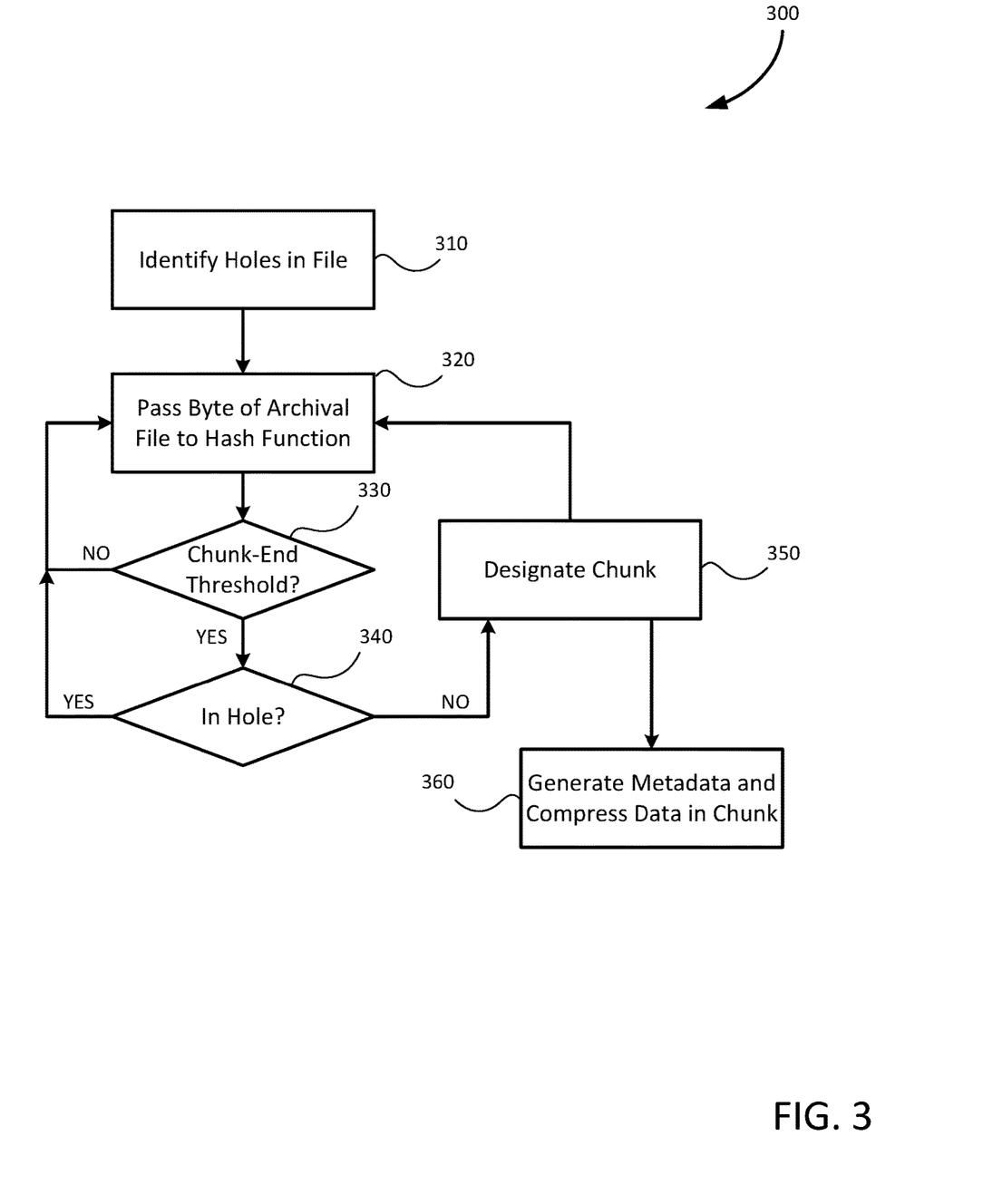
FIG. 3 is a flowchart of a method for operating a sparse files aware rolling checksum, according to examples of the present disclosure.

FIG. 3 is a flowchart of a method 300 for operating a sparse files aware rolling checksum, according to examples of the present disclosure. Method 300 begins with block 310, where the system identifies where holes are located in an archival file. For example, an operating system may indicate various ranges in a memory that are reserved or otherwise not being used to store data. When a certain range satisfies a hole-size threshold to define a hole (e.g., at least M sequential bytes of unused space), the operating system may identify the range as a hole that should be treated differently than other (smaller) regions of unused space when dividing the archival file into chunks. In various examples, the operating system may store the ranges identified as including holes in a lookup table or other data structure for analysis by a rolling checksum function or other hash function.

At block 320, the system passes, in sequence, each byte of the archival file to a hash function, such as a rolling checksum function. The hashing function hashes a rolling window of bytes passed to it to determine how the archival file is to be divided into chunks. In various examples, a user may configure a chunk-end threshold N so that the hash function signals the end of the current chunk once a window of N bytes of unused space is observed.

At block 330, the system determines whether the hash function has returned a chunk-end threshold number of bytes of unused space in sequence. When the chunk-end threshold has not yet been reached, method 300 returns to block 320, where the system shifts the bytes currently under analysis by the hash function and passes in the next byte for analysis. For example, when analyzing a window of sixteen bytes, the system may hold the associated values for each byte in a register, and perform a register shift operation to shift out the earlier byte in the sequence, shift forward the remaining bytes in the register, and pass in a new byte in the sequence for analysis.

When the chunk-end threshold has been reached, method 300 proceeds to block 340, where the system determines whether the window under analysis is in a hole in the archival file. In various examples, the location of holes in the archival file is known before passing each byte of the archival file to the hash function (per block 320) during the chunking operation. In some examples, the locations of the holes in the archival file are determined in response to beginning the chunking operation. Therefore, the hash function may check the determined locations of the holes against the current location of the last N+1 observed bytes to determine whether the current locations are within a known hole.

In some examples, the hash function may initially identify a chunk as being in a hole until a non-zero output is received from the hash function. Accordingly, after designating the previous chunk (e.g., after observing N bytes of unused space), the hash function may treat the next sequence of bytes as belonging to a hole until a non-zero value is observed. In various examples, the size of the window observed is at least one byte larger than the chunk-end threshold (e.g., at least N+1 bytes), so that the hash function avoids designating a chunk-end padding space of N bytes as being part of a hole, even when the chunk-end padding space is followed in sequence by unused space that is designated as a hole.

When the system determines that the sequence of bytes from the archival file are located in a hole, method 300 returns to block 320, where the system shifts the bytes currently under analysis by the hash function and passes in the next byte for analysis. Stated differently, the determination that the last N bytes are part of a hole is used as a filter for the behavior of the hash function that allows the hash function to ignore a signal to end a chunk when the chunk described a hole in the archival file. When the sequential bytes reach the end of the hole, the hash function resumes listening to the chunk-end signal of observing at least N bytes of unused space to designate the end of a chunk, and method 300 proceeds to block 350 to designate the chunk as a hole-chunk.

Otherwise, when the system determines that the N sequential bytes from the archival file are not located in a hole (per block 340) and that these sequential bytes are of unused space (per block 330), method 300 proceeds to block 350, where a chunk is designated.

At block 350, the hash function designates a chunk in the archival file. In response to detecting that a chunk-end threshold number of sequential bytes from the archival file produced zero-outputs from the hash function and that the sequential bytes are located in a hole in the archival file, the system designates a hole-chunk. In response to detecting that a chunk-end threshold number of sequential bytes from the archival file produced zero-outputs from the hash function and that the sequential bytes are not located in a hole in the archival file, the system designates a data-chunk. In some examples, a data-chunk may represent a sequence of bytes that represent unused space when the length of the unused space is less than a hole-size threshold (e.g., M), such that the data-chunk represents a sequence of bytes equal to the chunk-end threshold (e.g., N) in length.

Method 300 then returns to block 320, where the system shifts the bytes currently under analysis by the hash function and passes in the next byte for analysis. When returning to block 320 from block 350, the system begins tracking the next sequence of bytes for a new chunk.

From block 350, method 300 proceeds to block 360, where the system generates metadata for the chunk and compresses the data in the chunk. In various examples, the metadata include a location or offset of the chunk within the archival file, a length of the chunk, whether the chunk is a hole-chunk (e.g., representing only unused space) or a data-chunk, and (when the chunk is a data-chunk) a hash value of the represented data in the chunk. Additionally or alternatively to locational offsets and lengths, the metadata can include start and end byte locations for the chunk in the archival file. The metadata allow a destination system to compare corresponding segments of a local file to the chunk produced by another system (e.g., a source system) and determine whether to request or implement the chunk to synchronize the destination system to the version of the archival file offered by the source system. Additionally, by knowing when a certain chunk is a hole-chunk, the system may transmit the data-chunks and not the hole-chunks in response to receiving a request from a destination system for the archival file, or the destination system may ignore (e.g., not perform a hash of a corresponding section of a local file) the hole-chunk.

Figure 4:
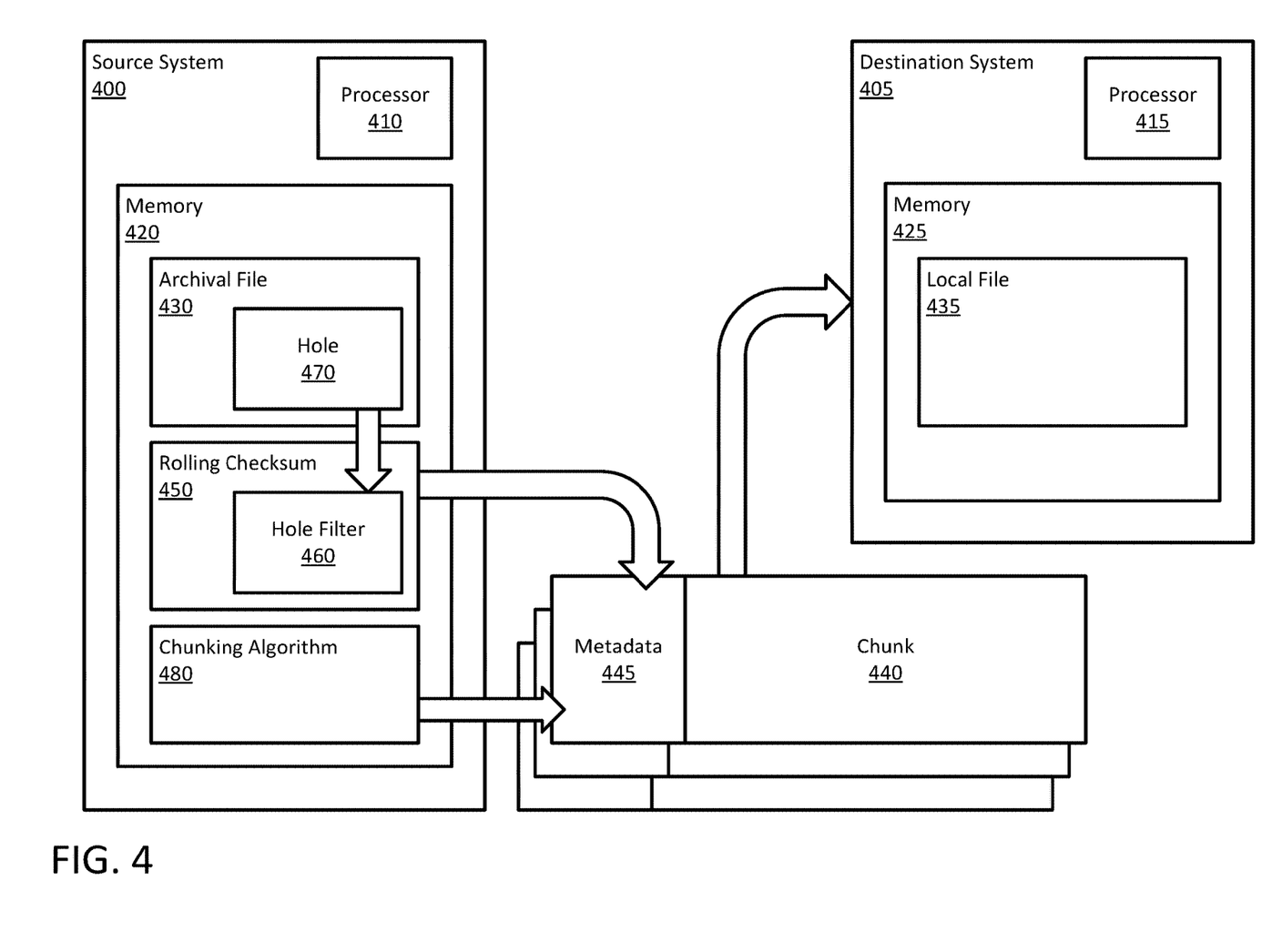
FIG. 4 is a diagram of a system using a sparse files aware rolling checksum, according to examples of the present disclosure.

FIG. 4 is a diagram of a system 400 using a sparse files aware rolling checksum, according to examples of the present disclosure. As illustrated, a source system 400, which may be a virtual system or a physical system, includes a processor 410 and a memory 420 (both of which may also be physical or virtual) including various instructions for dividing an archival file 430 into a plurality of chunks 440. These chunks 440 may be pushed to or requested by a destination system 405, which may be a virtual system or a physical system that includes a processor 415 and a memory 425 (both of which may also be physical or virtual) including various instructions for synchronizing a local file 435 corresponding to the archival file 430. In various examples, the archival file 430 is a current or most up-to-date version of an image of the memory 420 or another storage device and the local file 435 is an earlier or outdated version of the archival file 430 that is being updated to the current version.

A rolling checksum 450 or other hash function identifies the end of one chunk 440 (and beginning of the next chunk 440) in the archival file 430 in response to observing unused space of a chunk-end threshold number of bytes in sequence within the archival file 430. For example, a user or operating system may set the chunk-end threshold to N bytes, and after the rolling checksum 450 observes N bytes of unused space in sequence in the archival file 430, the rolling checksum 450 indicates that the current chunk 440 should end, and that a next chunk 440 should begin. However, the rolling checksum 450 includes a hole filter 460 that identifies whether the chunk 440 is located in a region of the archival file 430 designated as a hole 470, and should continue processing the chunk 440 despite observing Nor more bytes of unused space in sequence.

In various examples, a user or the operating system may set a hole-threshold size M to define how long a sequence of bytes of unused space should be to qualify as a hole 470 in the archival file 430. For example, when the hole-size threshold M is set to 500 kilobytes, the chunk-end threshold N is set to 16 bytes, and a sequence of 1 gigabyte of unused space is observed in the archival file 430, the hole filter 460 signals the rolling checksum 450 to process the 1 gigabyte of unused space as a single chunk 440; a hole-chunk. In contrast, when the hole-size threshold M is set to 700 kilobytes, the chunk-end threshold N is set to 16 bytes, and a sequence of 600 kilobytes of unused space is observed in the archival file 430, the hole filter 460 does not signal the rolling checksum 450 to process the 600 kilobytes of unused space as a singular hole 470, and the rolling checksum 450 divides the space into 37,500 (±1 depending on how the end of the previous chunk 440 is defined) individual chunks 440 of 16 bytes each.

A chunk handling algorithm 480 (also referred to as a chunker) may compress the data from the archival file 430 included within a chunk 440, and generates and appends metadata 445 for each chunk 440 that identifies where the data included in the chunk 440 is located in the archival file 430, whether the chunk 440 is a hole-chunk or a data-chunk, and a comparative hash value for the data included in the chunk 440. In various examples, the locational metadata and comparative hash value are generated by the source system 400 to allow the destination system 405 to perform an equivalent hashing algorithm on a corresponding section of the local file 435 to identify whether a certain chunk 440 includes an update or change in the archival file 430 relative to the local file 435.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:
    passing, in sequence, each byte of an archival file stored on a source system to a hash function; and
    detecting that a first sequence of bytes from the archival file produces outputs from the hash function of zero, wherein a first number of bytes in the first sequence of bytes satisfies a chunk-end threshold;
    determining that the first sequence of bytes is located in a hole in the archival file of a greater number of bytes than the chunk-end threshold;
    designating a hole-chunk of the archival file that includes first metadata for a first location and a first length of the hole in the archival file;
    detecting that a second sequence of bytes from the archival file produces outputs from the hash function of non-zero, wherein a second number of bytes in the second sequence of bytes satisfies the chunk-end threshold;
    designating a data-chunk that includes second metadata of a second location and a second length of the second sequence of bytes in the archival file and a hashed value of the second sequence of bytes, wherein the second metadata configures a destination system to ignore the hole-chunk and its additional metadata during synchronization of the archival file;
    receiving a request to transmit the archival file to the destination system; and
    synchronizing the archival file with respect to the destination system by transmitting the second metadata and the archival file to the destination system by transmitting, from the source system to the destination system, the data-chunk and not transmitting the hole-chunk and the additional metadata.

11

2. The method of claim 1, further comprising:
detecting that a third sequence of bytes from the archival file produce outputs from the hash function of zero, wherein a third number of bytes in the third sequence of bytes satisfies the chunk-end threshold;
determining that the third sequence of bytes is not located in a second hole in the archival file of a greater number of bytes than the chunk-end threshold:
designating a second data-chunk that includes third metadata of a third location and a third length of the third sequence of bytes in the archival file and a second hashed value of the third sequence of bytes; and
wherein transmitting the archival file to the destination system further comprises transmitting the second data-chunk despite the second data-chunk describing empty space in the archival file.

3. The method of claim 2, wherein the second data-chunk represents unused space in the archival file less than a hole-size threshold, wherein the third sequence of bytes includes a number of bytes equal to the chunk-end threshold.

4. The method of claim 1, wherein designating the hole-chunk further comprises compressing the first sequence of bytes and indicating in the first metadata that the hole-chunk represents empty space in the archival file; and
wherein designating the data-chunk further comprises compressing the second sequence of bytes and any preceding bytes since an end of the hole and indicating in the second metadata that the data-chunk represents used space in the archival file.

5. The method of claim 1, wherein a number of bytes included in the hole is at least ten times more than a value of the chunk-end threshold.

6. The method of claim 1, wherein the first metadata indicates a start value of a first byte of the first sequence of bytes and an end value designated by a final byte in the hole.

7. The method of claim 1, wherein a location of the hole in the archival file is known before passing each byte of the archival file to the hash function.

8. The method of claim 1, wherein the destination system receives a plurality of data-chunks and a corresponding plurality of metadata for the plurality of data-chunks designated in the archival file and reproduces the archival file with identical bit spacing between each data-chunk of the plurality of data-chunks, thereby reproducing the hole in the first location having received neither the hole-chunk nor the first metadata.

9. A system, comprising:
a processor; and
a memory including instructions that, when executed by the processor, perform operations comprising:
passing, in sequence, each byte of an archival file stored on a source system to a hash function;
detecting that a first sequence of bytes from the archival file produces outputs from the hash function of zero, wherein a first number of bytes in the first sequence of bytes satisfies a chunk-end threshold, and
determining that the first sequence of bytes is located in a hole in the archival file of a greater number of bytes than the chunk-end threshold;
designating a hole-chunk of the archival file that includes first metadata for a first location and a first length of the hole in the archival file;
compressing the first sequence of bytes and indicating in the first metadata that the hole-chunk represents empty space in the archival file;
detecting that a second sequence of bytes from the archival file produces outputs from the hash function of non-zero, wherein a second number of bytes in the second sequence of bytes satisfies the chunk-end threshold;
determining that the second sequence of bytes is not located in a second hole in the archival file of a greater number of bytes than the chunk-end threshold;
designating a data-chunk that includes second metadata of a second location and a second length of the second sequence of bytes in the archival file and a hashed value of the second sequence of bytes, wherein the second metadata configures a destination system to ignore the hole-chunk and its additional metadata during synchronization of the archival file; and
compressing the second sequence of bytes and any preceding bytes since an end of the hole and indicating in the second metadata that the data-chunk represents used space in the archival file despite representing empty space in the archival file.

10. The system of claim 9, wherein the operations further comprise:
detecting that a third sequence of bytes from the archival file produce non-zero outputs from the hash function, wherein a third number of bytes in the third sequence of bytes satisfies the chunk-end threshold, and
designating a second data-chunk that includes third metadata of a third location and a third length of the third sequence of bytes in the archival file and a second hashed value of the third sequence of bytes.

11. The system of claim 9, wherein the operations further comprise:
receiving a request to transmit the archival file to the destination system; and
transmitting the data-chunk and not transmitting the hole-chunk and the additional metadata, despite the data-chunk and the hole-chunk representing empty space in the archival file.

12. The system of claim 9, wherein the data-chunk represents unused space in the archival file less than a hole-size threshold, wherein the second sequence of bytes includes a number of bytes equal to the chunk-end threshold.

13. The system of claim 9, wherein the first metadata indicates of a start value of a first byte of the first sequence of bytes and an end value designated by a final byte in the hole.

14. The system of claim 9, wherein the hole-chunk represents a greater number of bytes than the data-chunk, wherein the first metadata and the second metadata are represented by an equivalent number of bytes, and wherein a difference between the chunk-end threshold and a hole-size threshold reduces a compressed size of the archival file compared to a second compressed version of the archival file in which the first sequence of bytes is represented by a plurality of chunks set according to the chunk-end threshold and associated metadata for the plurality of chunks.

15. A non-transitory memory including instructions that are executable by a processor to perform operations comprising:
passing, in sequence, each byte of an archival file stored on a source system to a hash function;
detecting that a first sequence of bytes from the archival file produces outputs from the hash function of zero, wherein a first number of bytes in the first sequence of bytes satisfies a chunk-end threshold;

determining that the first sequence of bytes is located in a hole in the archival file of a greater number of bytes than the chunk-end threshold;

designating a hole-chunk of the archival file that includes first metadata for a first location and a first length of the hole in the archival file;

detecting that a second sequence of bytes from the archival file produces non-zero outputs from the hash function, wherein a second number of bytes in the second sequence of bytes satisfies the chunk-end threshold;

designating a data-chunk that includes second metadata of a second location and a second length of the second sequence of bytes in the archival file and a hashed value of the second sequence of bytes, wherein the second metadata configures a destination system to ignore the hole-chunk and its additional metadata during synchronization of the archival file;

receiving a request to transmit the archival file to the destination system; and synchronizing the archival file with respect to the destination system by transmitting the data-chunk and the second metadata and transmitting neither the hole-chunk nor the first metadata nor the additional metadata to the destination system despite both the data-chunk and the hole-chunk both corresponding to empty space in the archival file.

16. The memory of claim 15, wherein the operations further comprise:

detecting that a third sequence of bytes from the archival file produce outputs from the hash function of non-zero value, wherein a third number of bytes in the third sequence of bytes satisfies the chunk-end threshold, and designating a second data-chunk that includes third metadata of a third location and a third length of the third sequence of bytes in the archival file and a second hashed value of the third sequence of bytes; and wherein synchronizing the archival file with respect to the destination system further comprises transmitting the second data-chunk to describe used space in the archival file.

17. The memory of claim 16, wherein designating the hole-chunk further comprises compressing the first sequence of bytes and indicating in the first metadata that the hole-chunk represents empty space in the archival file; and wherein designating the second data-chunk further comprises compressing the third sequence of bytes and any preceding bytes since an end of the hole and indicating in the third metadata that the second data-chunk represents used space in the archival file.

18. The memory of claim 15, wherein the data-chunk represents unused space in the archival file less than a hole-size threshold, wherein the second sequence of bytes includes a number of bytes equal to the chunk-end threshold.

19. The memory of claim 15, wherein a location of the hole in the archival file is known before passing each byte of the archival file to the hash function.

20. The memory of claim 15, wherein the destination system receives a plurality of data-chunks and a corresponding plurality of metadata for the plurality of data-chunks designated in the archival file and reproduces the archival file with identical bit spacing between each data-chunk of the plurality of data-chunks, thereby reproducing the hole in the first location having received neither the hole-chunk nor the first metadata.

\* \* \* \* \*